US012781947B1

(12) United States Patent
Yu

(10) Patent No.: US 12,781,947 B1
(45) Date of Patent: Nov. 3, 2026

(54) WORK LAMP

(71) Applicant: Ninghai Ruihai Electric APPLIANCE Co., Ltd., Ningbo (CN)

(72) Inventor: Haibo Yu, Ningbo (CN)

( * ) Notice: Subject to any disclaimer, the term of this patent is extended or adjusted under 35 U.S.C. 154(b) by 0 days.

(21) Appl. No.: 19/356,565

(22) Filed: Oct. 13, 2025

(30) Foreign Application Priority Data

Aug. 26, 2025 (CN) ........................ 202521821134.X

(51) Int. Cl.
*F21V 21/096* (2006.01)
*F21L 4/00* (2006.01)
*F21V 21/14* (2006.01)

(52) U.S. Cl.
CPC .............. *F21V 21/096* (2013.01); *F21L 4/00* (2013.01); *F21V 21/14* (2013.01)

(58) Field of Classification Search
CPC ........................................................ F21V 21/14
See application file for complete search history.

(56) References Cited

U.S. PATENT DOCUMENTS

2013/0271993 A1* 10/2013 Jan .......................... F21V 14/02 362/249.1
2018/0281672 A1* 10/2018 Squicciarini ......... B60Q 1/2611
2024/0142070 A1* 5/2024 Cao ........................... F21L 4/02

FOREIGN PATENT DOCUMENTS

CN 206669399 U * 11/2017 ................ F21L 2/00
CN 120062567 A * 5/2025 .............. F21V 19/00

* cited by examiner

*Primary Examiner* — Keith G. Delahoussaye

(57) ABSTRACT

A work lamp, including a main bracket body, a supporting frame, lamp holders and lamps; the supporting frame is movably arranged at a bottom of the main bracket body, the supporting frame is configured to switch to a supporting state where it forms an angle with the main bracket body or a storage state where it fits parallel to the main bracket body; several lamp holders are arranged at a top of the main bracket body; the rotatable supporting frame enables triangular support or straight-line shaped storage, adapting to different usage scenarios; the lamps are configured to be independently detached for handheld lighting or used with magnetic attachment or hanging; they can also be combined with the lamp holders for centralized power supply and lighting control; the lamp holders are connected using hinge components, supporting bidirectional angle rotation adjustment, allowing each lamp to project light in different directions.

10 Claims, 15 Drawing Sheets

WORK LAMP

TECHNICAL FIELD

The invention relates to the technical field of lamps, in particular to a work lamp.

BACKGROUND ART

A work lamp is a directional lighting device specifically designed for work. We often need to use them in our daily lives. Work lamps usually come with a handle for easy portability, but existing work lamps have the following shortcomings:

Work lamps in the prior art mostly use fixed brackets, which makes it difficult to balance the needs for both storage and multi-angle support. Additionally, they are typically equipped with a single, integrated lamp, which limits their application scenarios and results in an unsatisfactory user experience.

Therefore, the invention proposes a work lamp to solve the above problems.

SUMMARY OF THE INVENTION

In view of the shortcomings of the prior art, the invention provides a work lamp, which solves the problem that work lamps in the prior art mostly use fixed brackets, and are typically equipped with a single, integrated lamp, which limits their application scenarios.

In order to achieve the above purpose, the invention specifically adopts the following technical solutions:

- a work lamp, comprising a main bracket body, a supporting frame, lamp holders and lamps;
- the supporting frame is movably arranged at a bottom of the main bracket body, the supporting frame is configured to switch to a supporting state where it forms an angle with the main bracket body or a storage state where it fits parallel to the main bracket body;
- several lamp holders are arranged at a top of the main bracket body, with adjacent lamp holders connected by hinge components to form a foldable structure that allows relative rotation and angle adjustment;
- each lamp is detachably embedded in the lamp holder and has a first working state where it can be used independently after detaching from the lamp holder and a second working state where it is embedded in the lamp holder to adjust the angle synchronously.

Further, one side of the main bracket body is detachably mounted with a main battery pack, an interior of each lamp holder is provided with a conductive terminal seat, an interior of the main bracket body is provided with a main control switch electrically connected to the main battery pack and the conductive terminal seats, the main control switch controls the on/off of all the embedded lamps synchronously when the lamps are in the second working state.

Further, each lamp comprises a middle shell and a front shell and a rear shell fixed to both sides of the middle shell, the middle shell is made of aluminum material, one side of the middle shell is sequentially provided with a lamp board and a light bowl, and the other side is provided with a heat-insulating plate, one side of the heat-insulating plate is embedded with an auxiliary battery pack, and an interior of the front shell is provided with a lens corresponding to the light bowl.

Further, both ends of the heat-insulating plate on one side are provided with lamp magnets, one end of each lamp magnet passes through to one side of the rear shell, one side of the middle shell is further provided with a control board located above the heat-insulating plate, one side of the control board integrates a lamp switch, and the other side integrates a power interface group and conductive terminals, one side of the rear shell is embedded with a charging plug corresponding to the power interface group, one end of the lamp switch passes through to one side of the front shell.

Further, one side of the rear shell is provided with a groove, and a hook is rotatably arranged inside the groove.

Further, when the lamp is in the second working state, the conductive terminal seat contacts the conductive terminals to form an electrical connection, an interior of the lamp holder is provided with a through hole and iron sheets located at a top and a bottom of the through hole; when the lamp is in the second working state, the iron sheets are positioned opposite to the lamp magnets and magnetically connected, both ends of the lamp holder are provided with several limit posts inside.

Further, the bottom of the main bracket body is provided with a storage slot, the supporting frame is rotatably arranged at the bottom of the main bracket body by a pivot shaft, and the top of the main bracket body is further provided with a decorative sheet to cover the pivot shaft; when the supporting frame is in the supporting state, the supporting frame and the main bracket body form a triangular shape; when the supporting frame is in the storage state, the supporting frame and the main bracket body form a straight line.

Further, a bottom of one end of the main bracket body and bottoms of both ends of the supporting frame are embedded with bracket magnets, a top of one end of the main bracket body is provided with a handle, the handle is arranged at an inclined angle, one side of the main bracket body is provided with a conductive socket, one side of the main battery pack is provided with a conductive plug, the main battery pack realizes electrical and mechanical connection by plugging the conductive plug into the conductive socket.

Further, the hinge component comprises a double-headed screw, both ends of the double-headed screw extending into interiors of two adjacent lamps, both ends of the double-headed screw are rotatably provided with U-shaped components, two sides of the U-shaped components are provided with single-headed screws, and one end of each single-headed screw passes into the interior of the lamp holder and is fitted with a fixing component and a nut, one end of the fixing component is provided with several limiting holes that are engaged with the limit posts, both sides of the U-shaped component are provided with decorative shells.

Further, the hinge component further comprises a triple-headed screw, the triple-headed screw is used to connect the main bracket body and the lamp holder adjacent to the main bracket body, two ends of the triple-headed screw extend into the interior of the lamp holders and are fitted with fixing components and nuts, the other end extends into the interior of the main bracket body and is fitted with a nut, several washers are fitted on the triple-headed screw, double-headed screw, and single-headed screw Compared with the prior art, the invention provides a work lamp with the following advantageous effects:

in the invention, the rotatable supporting frame enables triangular support or straight-line shaped storage, adapting to different usage scenarios. The lamps are configured to be independently detached for handheld lighting or used with magnetic attachment or hanging. They can also be combined with the lamp holders for centralized power supply and lighting control. The lamp holders are connected using hinge components, supporting bidirectional angle rotation adjustment, allowing each lamp to project light in different directions. The independent lamps feature built-in heat dissipation middle shells, reducing the risk of high heat-related failures. The lamps can be quickly attached or detached from the lamp holders via magnetic attraction between the lamp magnets and the iron sheets. The overall design balances portability, multi-scenario adaptability, and flexible lighting angle adjustment, meeting the needs for fixed desktop lighting, metal surface adsorption, and mobile lighting.

BRIEF DESCRIPTION OF ACCOMPANYING DRAWINGS

Figure 1:
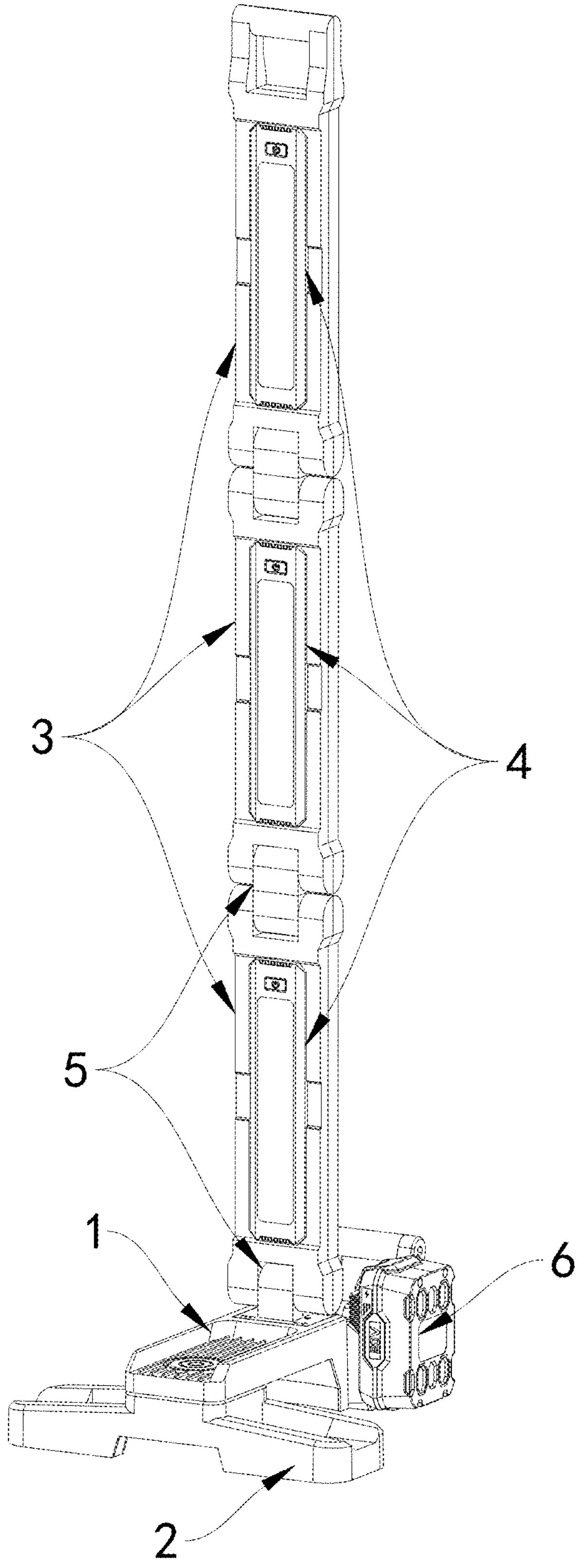
FIG. 1 is a schematic diagram of the structure of the lamps in the second working state.

In the figures: 1 main bracket body; 11 main control switch; 12 storage slot; 13 pivot shaft; 14 decorative sheet; 15 bracket magnet; 16 handle; 17 conductive socket; 2 supporting frame; 3 lamp holder; 31 conductive terminal seat; 32 through hole; 33 iron sheet; 34 limit post; 35 carrying handle; 4 lamp; 41 middle shell; 42 front shell; 421 lens; 43 rear shell; 431 charging plug; 432 groove; 433 hook; 44 lamp board; 45 light bowl; 46 heat-insulating plate; 47 auxiliary battery pack; 48 lamp magnet; 49 control board; 491 lamp switch; 492 power interface group; 493 conductive terminal; 494 charging terminal; 495 charging interface; 496 discharge interface; 5 hinge component; 51 double-headed screw; 52 triple-headed screw; 53 U-shaped component; 54 single-headed screw; 55 fixing component; 551 limiting hole; 56 nut; 57 decorative shell; 58 washer; 6 main battery pack; 61 conductive plug.

Specific Embodiment of the Invention

The technical schemes in the embodiments of the invention will be clearly and completely described in combination with the accompanying drawings in the embodiments of the invention. Obviously, the described embodiments are only some of the embodiments of the invention, but not all of the embodiments. Based on the embodiments in this invention, all other embodiments obtained by those of ordinary skill in the art without making creative efforts shall fall within the protection scope of this invention.

EMBODIMENTS

As shown in FIG. 1 to FIG. 17, one embodiment of the invention provides a work lamp, comprising a main bracket body 1, a supporting frame 2, lamp holders 3 and lamps 4; the supporting frame 2 is movably arranged at a bottom of the main bracket body 1, the supporting frame 2 is configured to switch to a supporting state where it forms an angle with the main bracket body 1 or a storage state where it fits parallel to the main bracket body 1; several lamp holders 3 are arranged at a top of the main bracket body 1, with adjacent lamp holders 3 connected by hinge components 5 to form a foldable structure that allows relative rotation and angle adjustment; each lamp 4 is detachably embedded in the lamp holder 3 and has a first working state where it can be used independently after detaching from the lamp holder 3 and a second working state where it is embedded in the lamp holder 3 to adjust the angle synchronously.

Figure 12:
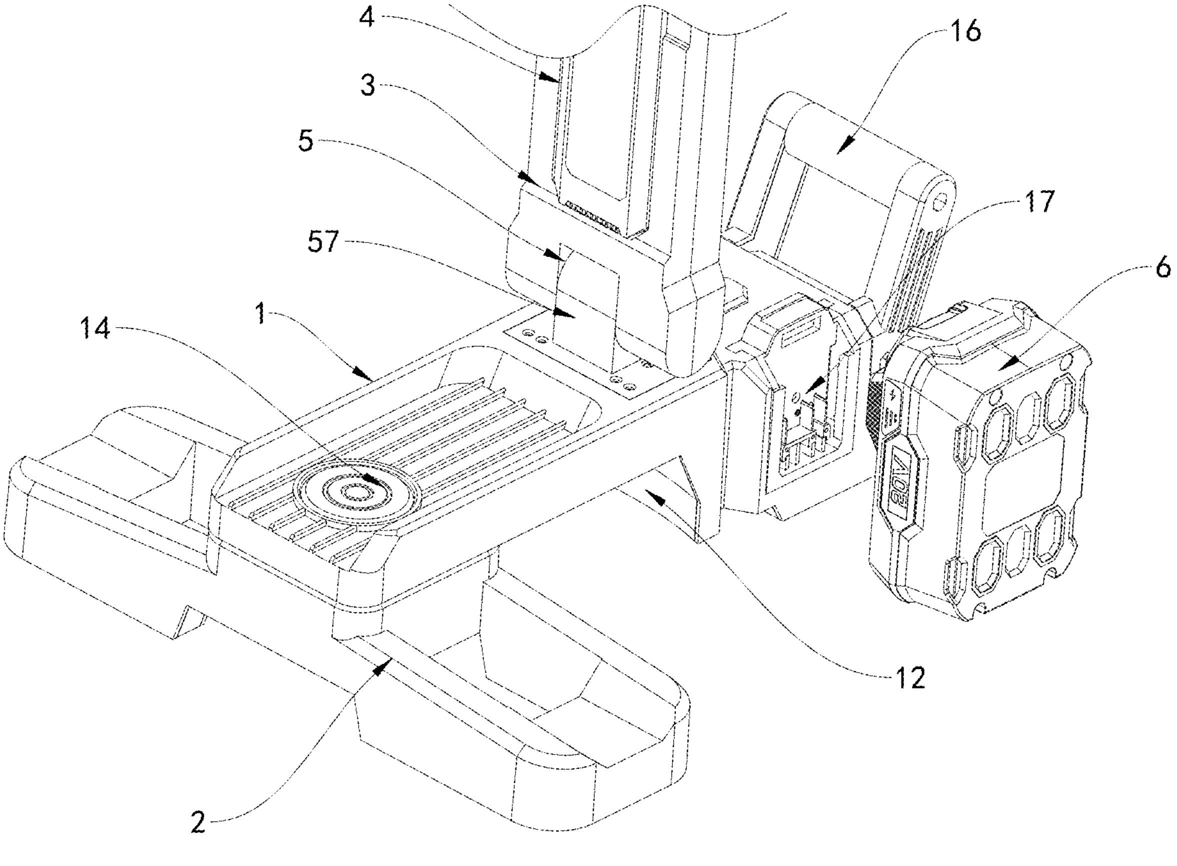
FIG. 12 is a schematic diagram of the structure of the invention with the main battery pack separated from the main bracket body.
Figure 13:
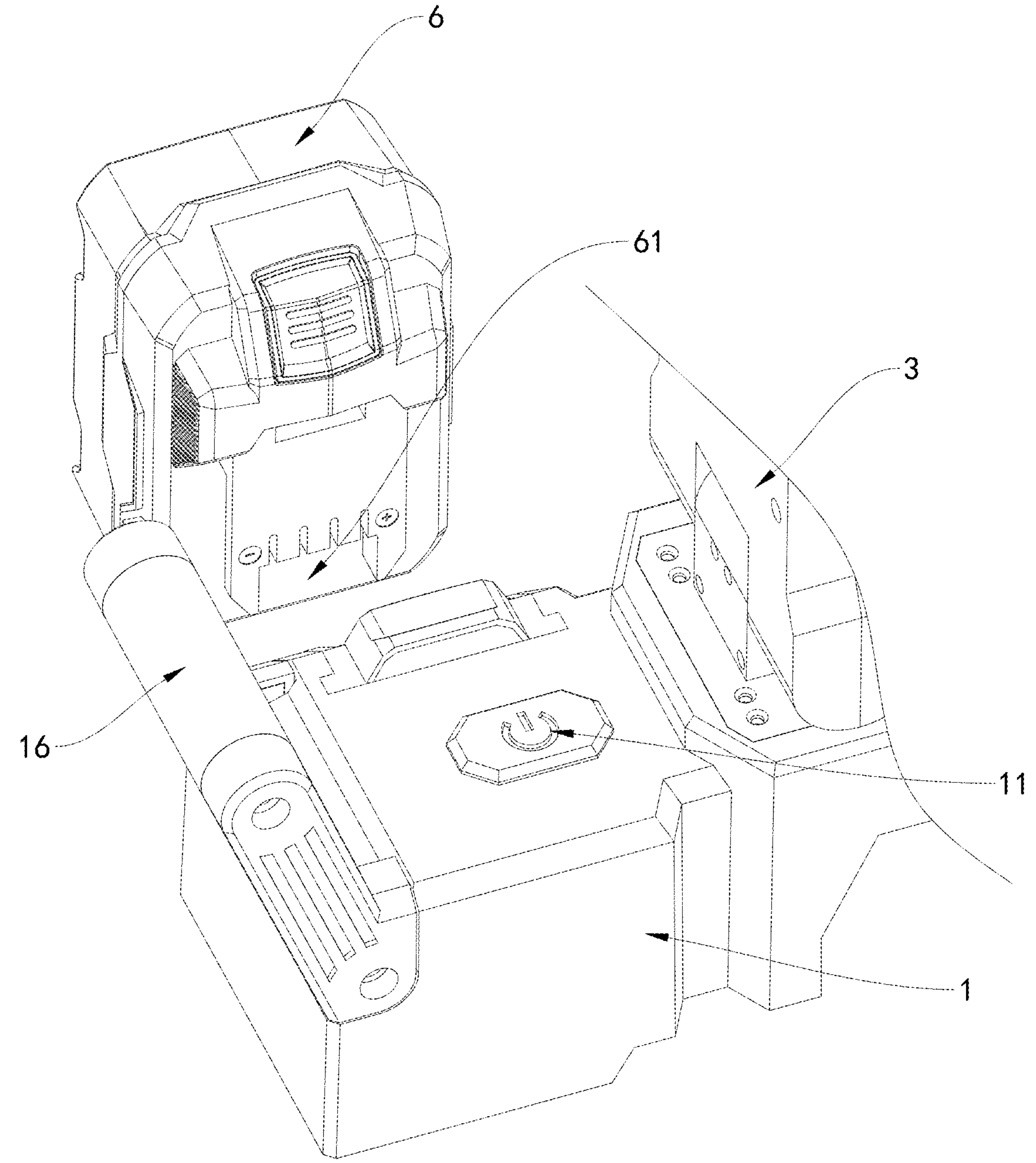
FIG. 13 is a schematic diagram of the structure of the invention with the main battery pack separated from the main bracket body.

As shown in FIG. 12 to FIG. 13, in some embodiments, one side of the main bracket body 1 is detachably mounted with a main battery pack 6, an interior of each lamp holder 3 is provided with a conductive terminal seat 31, an interior of the main bracket body 1 is provided with a main control switch 11 electrically connected to the main battery pack 6 and the conductive terminal seats 31, the main control switch 11 controls the on/off of all the embedded lamps 4 synchronously when the lamps 4 are in the second working state.

When several lamp holders 3 are combined with the main bracket body 1, the volume becomes large, making it suitable for placement on a desktop or attachment to metal objects for use; when the user applies it in more portable scenarios, the first working state can be used, the lamp 4 can be removed from the interior of the lamp holder 3 for handheld use or hung using the hook 433, making it more convenient to use; after the lamps 4 are embedded into the lamp holders 3, the conductive terminals 493 contact the conductive terminal seats 31, completing the circuit connection; the lamps 4 are powered by the main battery pack 6, and the main control switch 11 allows multiple lamps 4 to be turned on or off simultaneously, making the operation more convenient.

Figure 5:
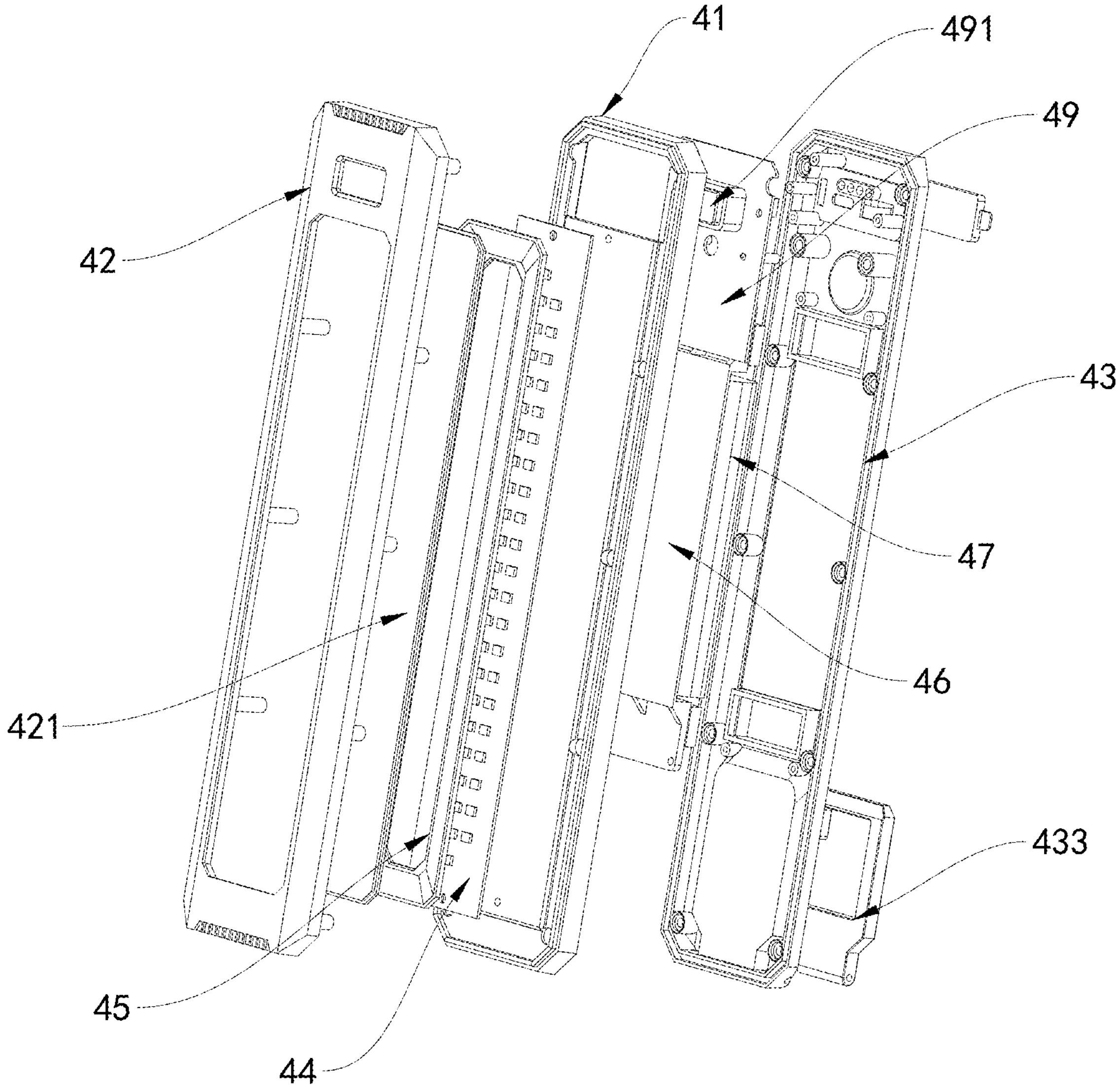
FIG. 5 is an exploded view of the structure of the lamp.
Figure 6:
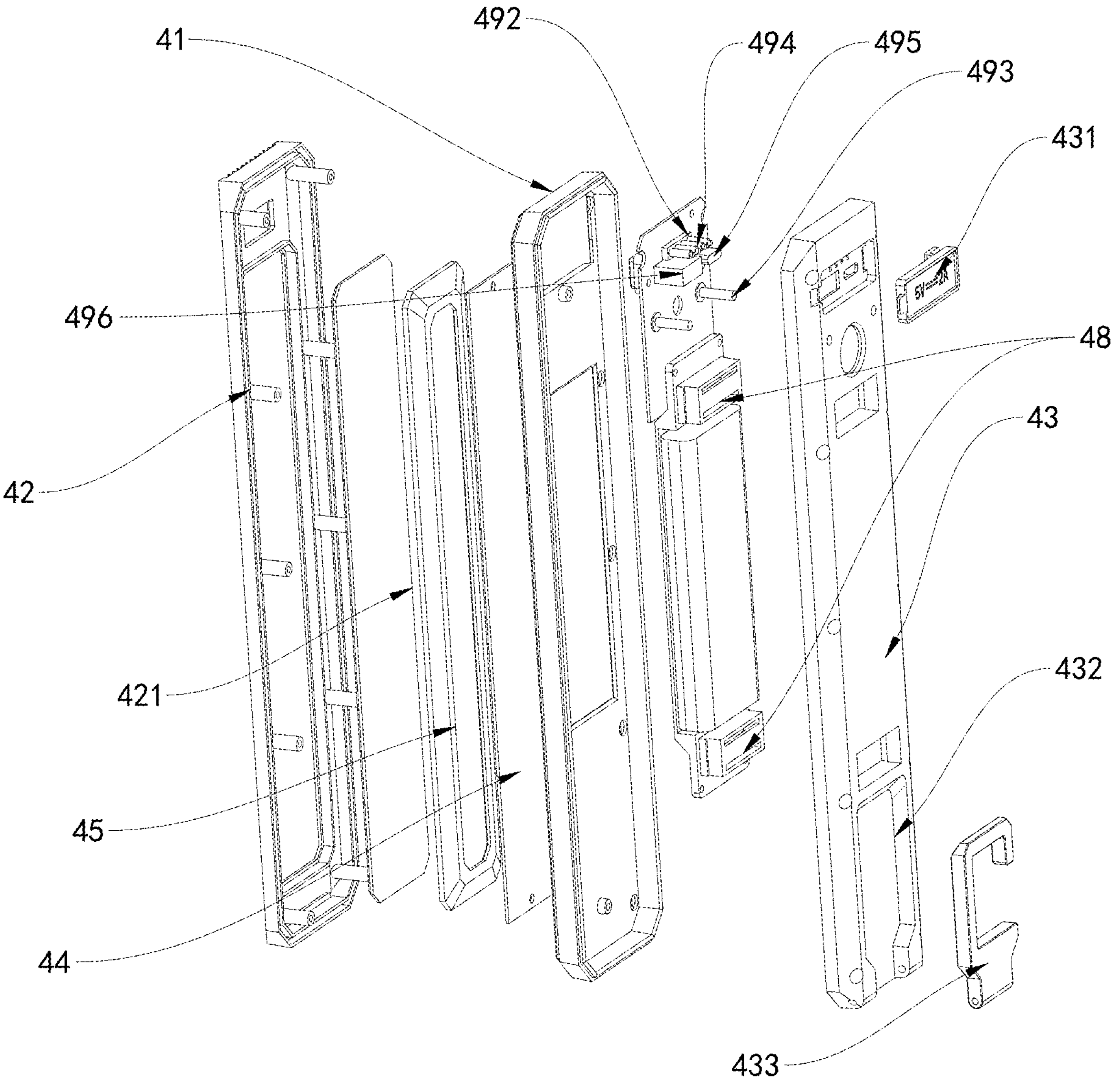
FIG. 6 is an exploded view of the structure of the lamp.
Figure 7:
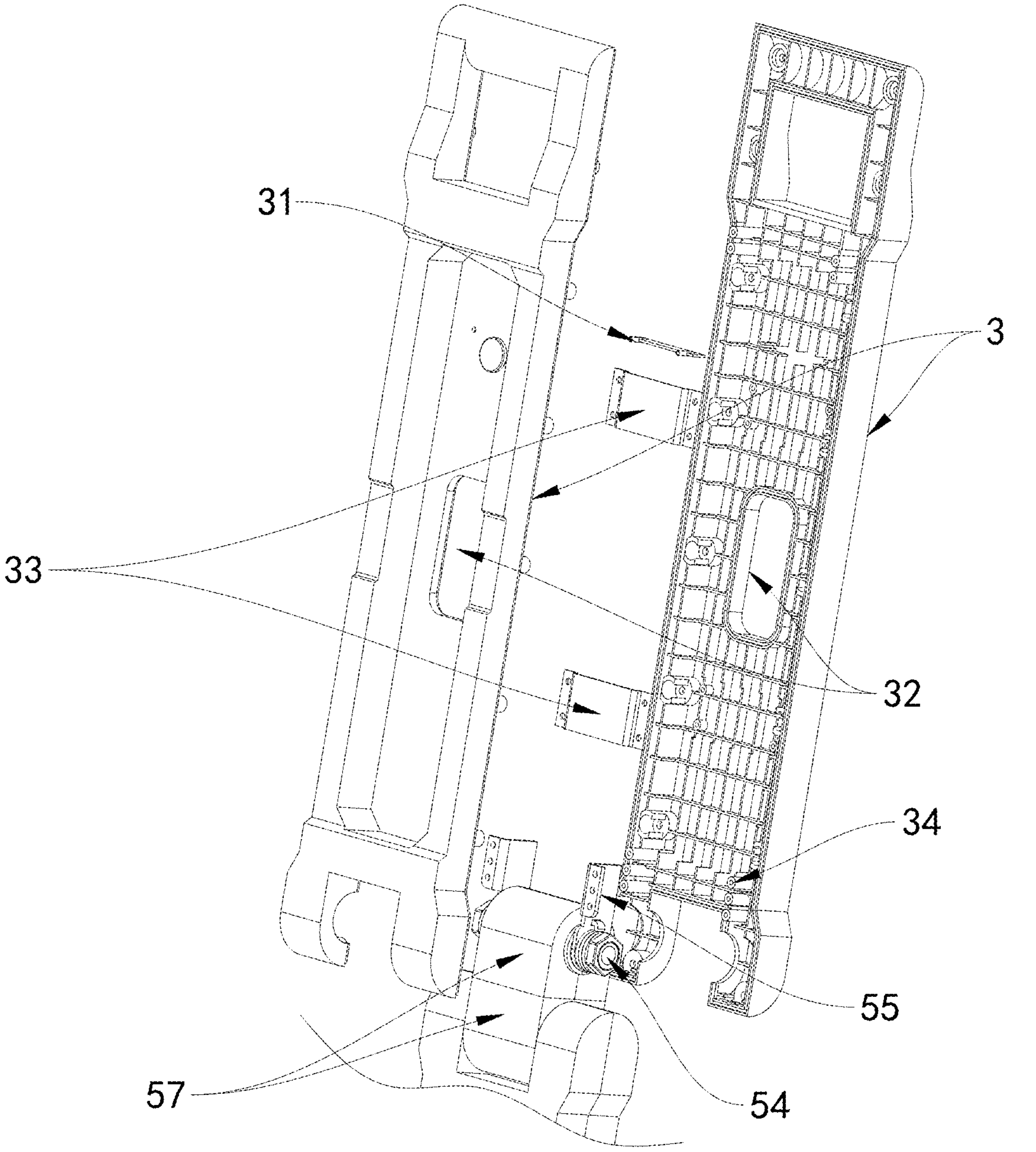
FIG. 7 is an exploded view of the structure of the lamp holder.
Figure 8:
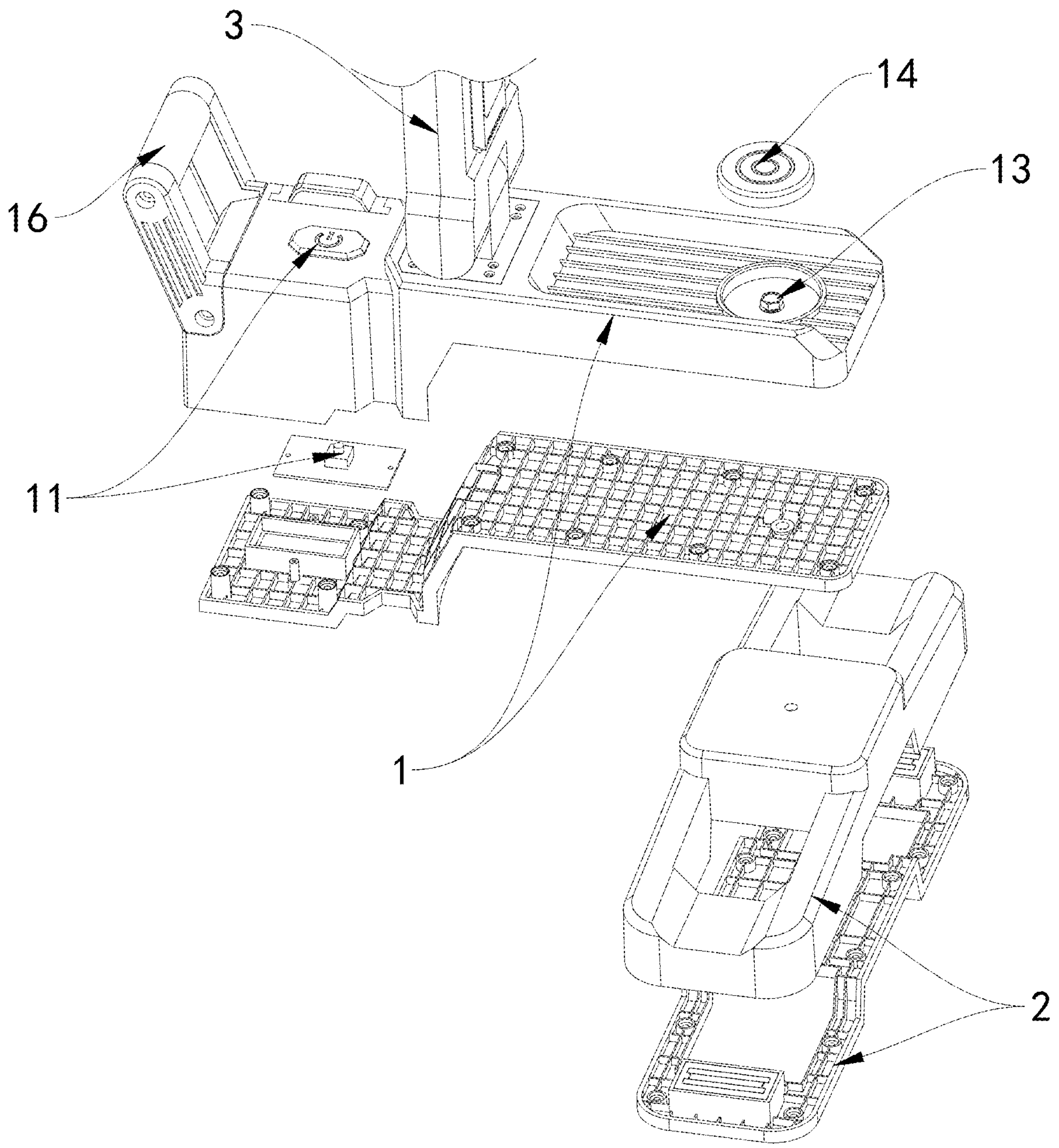
FIG. 8 is a schematic diagram of the structure of the main control switch of the invention.

As shown in FIG. 5 to FIG. 7, in some embodiments, each lamp 4 comprises a middle shell 41 and a front shell 42 and a rear shell 43 fixed to both sides of the middle shell 41, the middle shell 41 is made of aluminum material, one side of the middle shell 41 is sequentially provided with a lamp board 44 and a light bowl 45, and the other side is provided with a heat-insulating plate 46, one side of the heat-insulating plate 46 is embedded with an auxiliary battery pack 47, and an interior of the front shell 42 is provided with a lens 421 corresponding to the light bowl 45.

The lamp board 44 is in close contact with the middle shell 41, the lamp board 44 is made of aluminum material, which greatly enhances the heat dissipation efficiency of the lamp board 44, reducing the likelihood of lamp 4 failure due to high heat; in the first working state, the lamp 4 is powered by the auxiliary battery pack 47 inside it; when the auxiliary battery pack 47 runs out of power, it is recharged through the power interface group 492 by connecting a charging cable; the heat-insulating plate 46 is made of polyethylene or polypropylene material, the setting of heat-insulating plate 46 prevents the heat from the lamp board 44 from interacting with the heat emitted by the auxiliary battery pack 47; after the lamp board 44 is illuminated, the light bowl 45 reflects the light through the lens 421 and projects it outward.

As shown in FIG. 5 to FIG. 7, in some embodiments, both ends of the heat-insulating plate 46 on one side are provided with lamp magnets 48, one end of each lamp magnet 48 passes through to one side of the rear shell 43, one side of the middle shell 41 is further provided with a control board 49 located above the heat-insulating plate 46, one side of the control board 49 integrates a lamp switch 491, and the other side integrates a power interface group 492 and conductive terminals 493, one side of the rear shell 43 is embedded with a charging plug 431 corresponding to the power interface group 492, one end of the lamp switch 491 passes through to one side of the front shell 42.

The power interface group 492 comprises a charging terminal 494, a charging interface 495, and a discharge interface 496, the charging terminals 494 and charging interface 495 support two different types of charging cables to charge the auxiliary battery pack 47, the discharge interface 496 can be connected to a charging cable to charge electronic devices such as mobile phones and tablets, allowing it to function as a power bank in emergency situations, greatly improving the product's usability; after the lamp 4 is embedded into the lamp holder 3, the lamp magnets 48 align with the iron sheets 33, and the lamp magnets 48 attract the iron sheets 33, ensuring the lamp 4 is securely placed in the lamp holder 3; the lamp board 44 can be independently controlled for turning on or off using the lamp switch 491, the charging plug 431 is used to protect the power interface group 492; to use the power interface group 492, simply pry open the charging plug 431.

As shown in FIG. 5 to FIG. 7, in some embodiments, one side of the rear shell 43 is provided with a groove 432, and a hook 433 is rotatably arranged inside the groove 432.

the groove 432 is used to store the hook 433; when the hook 433 is stored inside the groove 432, it does not affect the assembly of the lamp 4 and lamp holder 3; the setting of the lamp magnets 48 not only improves the assembly stability of the lamp 4 and lamp holder 3, but also allows the lamp 4 to be attracted to metal objects when used independently; additionally, the hook 433 is configured to be used for hanging the lamp, providing multiple installation methods, this makes the lamp 4 highly versatile in the first working state, adaptable to different application scenarios; the arrangement of several lamps 4 makes the lamps 4 installed in different positions within the application scenario in the first working state, providing comprehensive lighting for the application scenario; alternatively, they are configured to be installed in the lamp holder 3 for centralized lighting; alternatively, some lamps 4 are configured in the first working state, while others are configured in the second working state, allowing users to freely combine them as needed.

As shown in FIG. 1, in some embodiments, when the lamp 4 is in the second working state, the conductive terminal seat 31 contacts the conductive terminals 493 to form an electrical connection, an interior of the lamp holder 3 is provided with a through hole 32 and iron sheets 33 located at a top and a bottom of the through hole 32; when the lamp 4 is in the second working state, the iron sheets 33 are positioned opposite to the lamp magnets 48 and magnetically connected, both ends of the lamp holder 3 are provided with several limit posts 34 inside.

When the lamp 4 needs to be removed from the lamp holder 3, the user can push the lamp 4 from a back of the lamp holder 3 through the through hole 32, causing the lamp magnets 48 to detach from the iron sheets 33; this allows the lamp 4 to be separated from the lamp holder 3, converting it from the second working state to the first working state; the through hole 32 is located between the two iron sheets 33, this design ensures that when the lamp 4 is pushed, the force of the lamp 4 is distributed more evenly, causing the lamp 4 to move outward from the lamp holder 3 evenly on all sides, making the operation more convenient, the setting of limit posts 34 is used to position and fix the fixing component 55.

Figure 2:
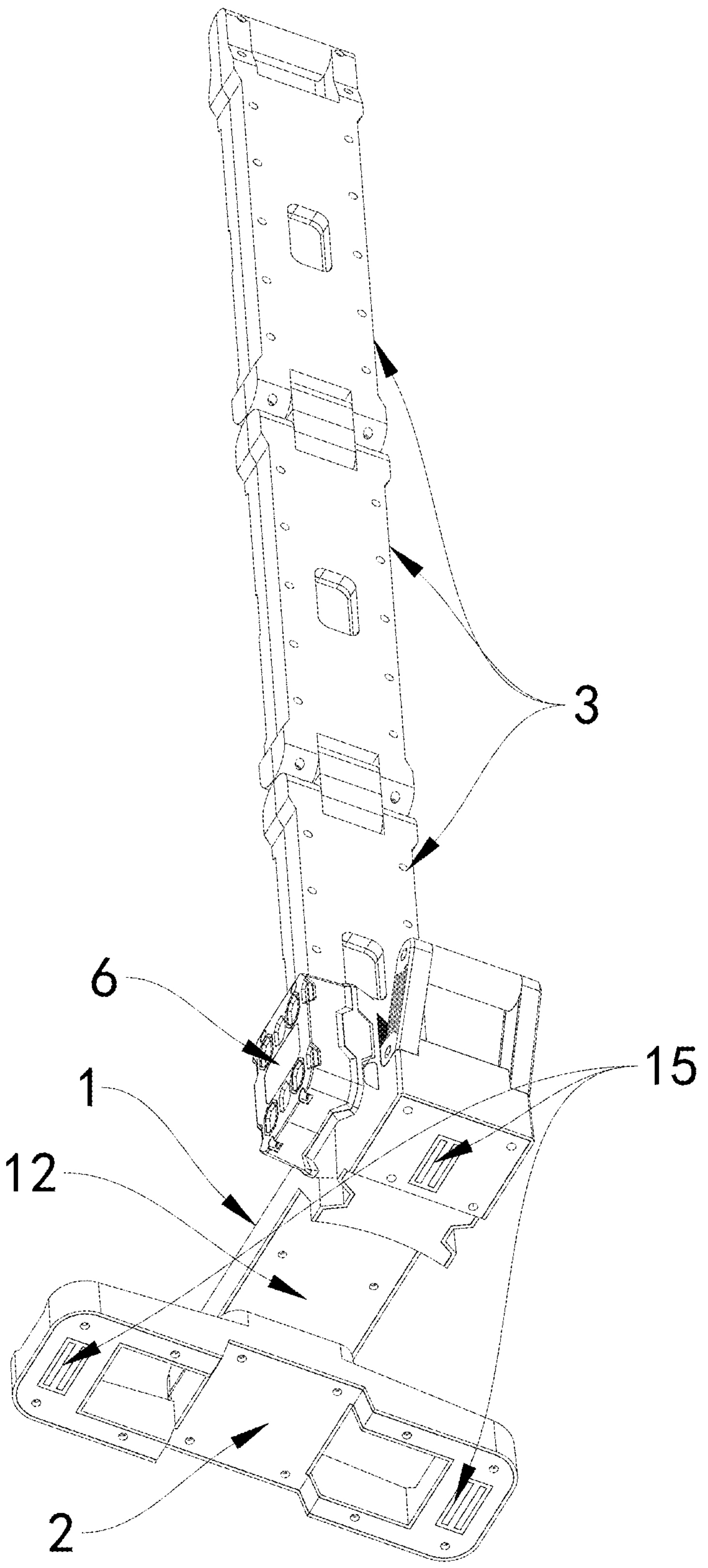
FIG. 2 is a schematic diagram of the structure of the supporting frame in the supporting state.
Figure 3:
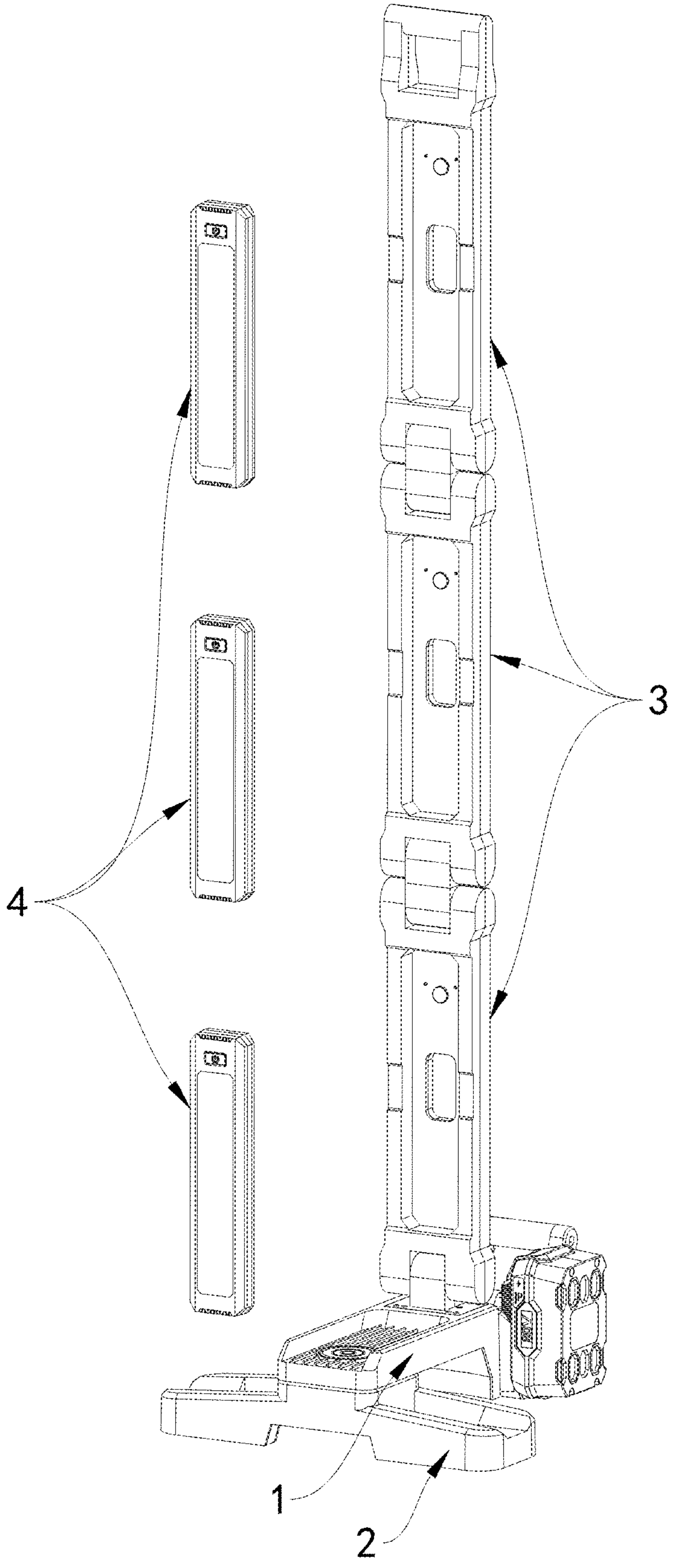
FIG. 3 is a schematic diagram of the structure of the lamps in the first working state.
Figure 4:
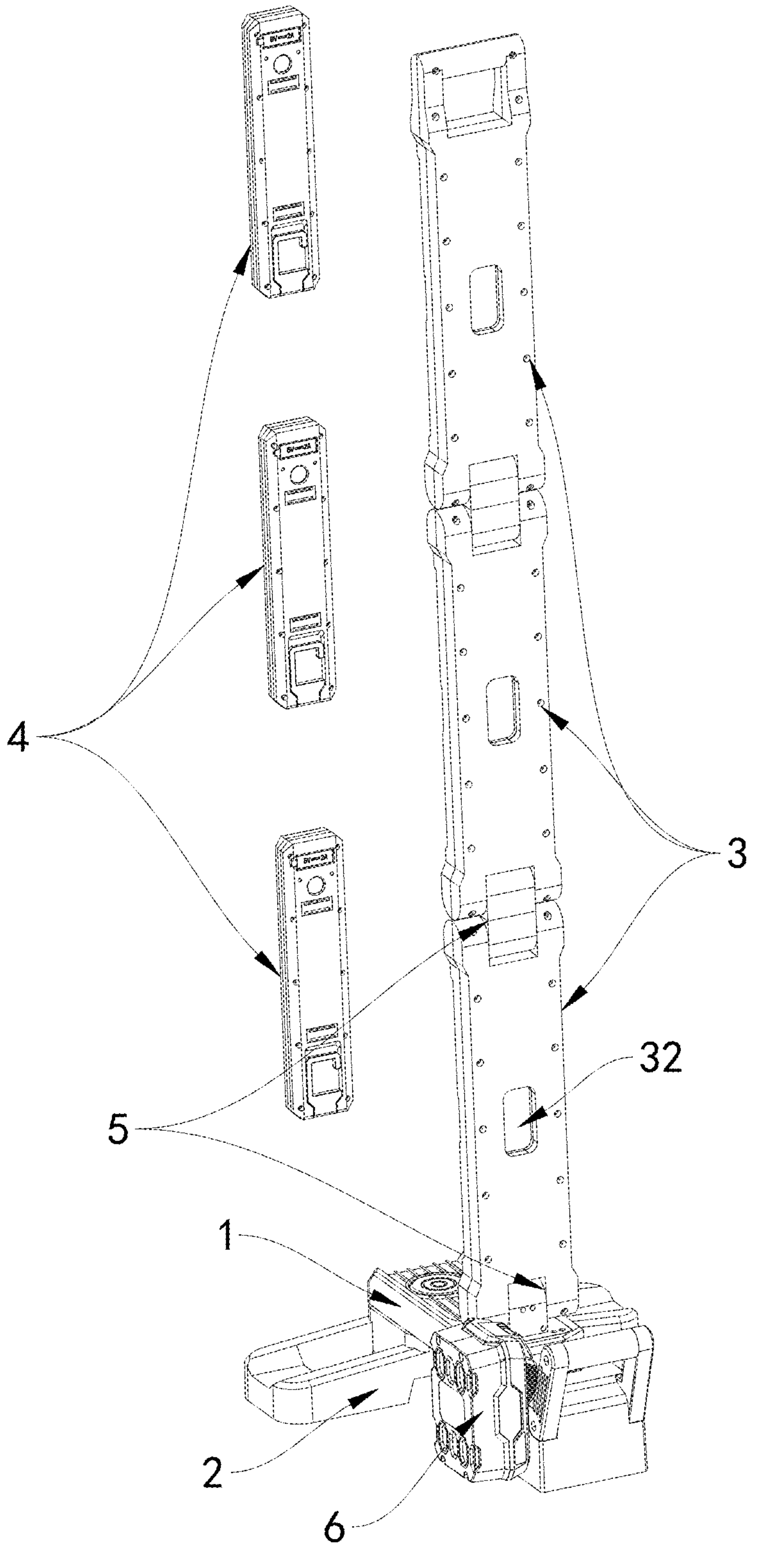
FIG. 4 is a schematic diagram of the structure of the lamps in the first working state.
Figure 14:
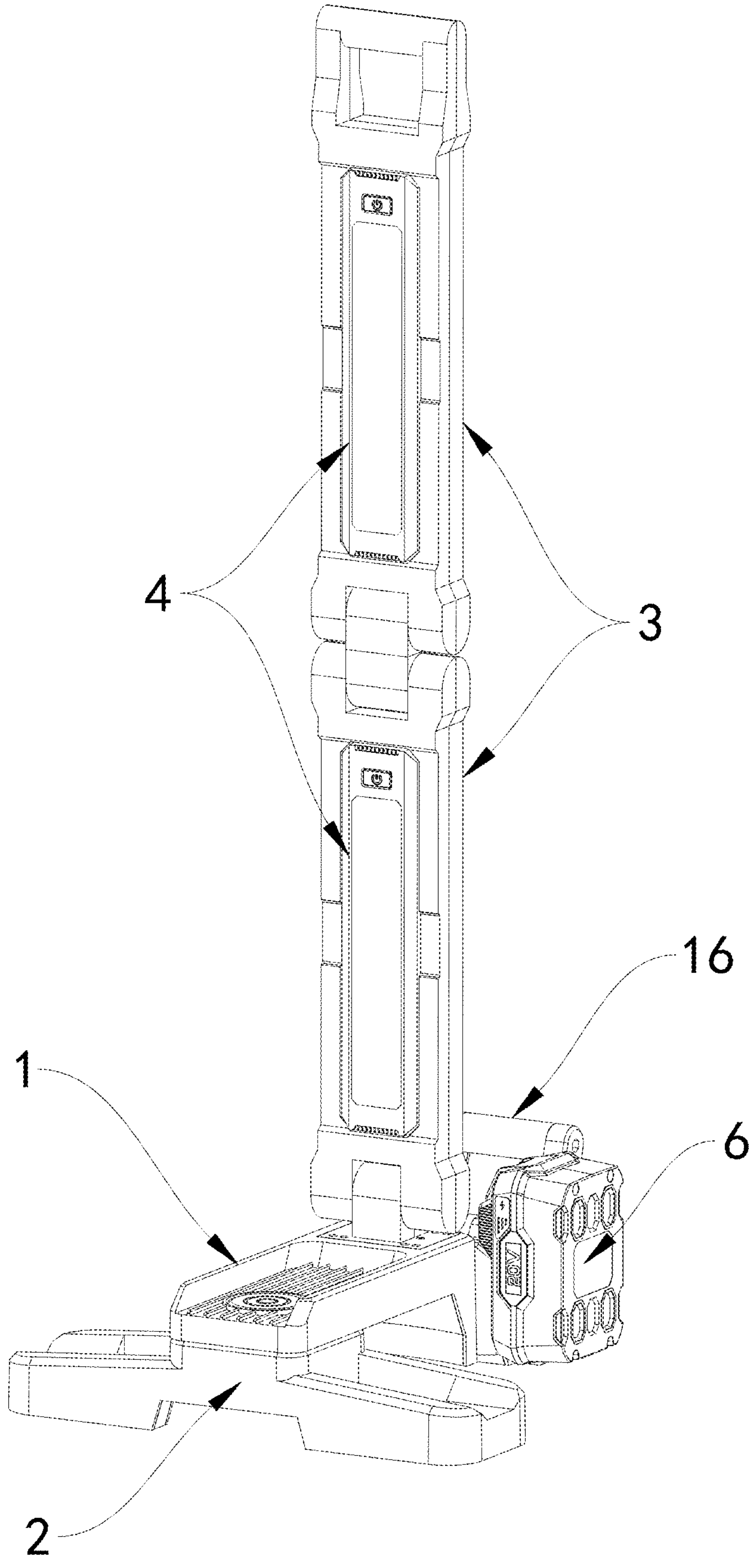
FIG. 14 is a schematic diagram of the structure of the invention with two lamp holders connected to the main bracket body.
Figure 15:
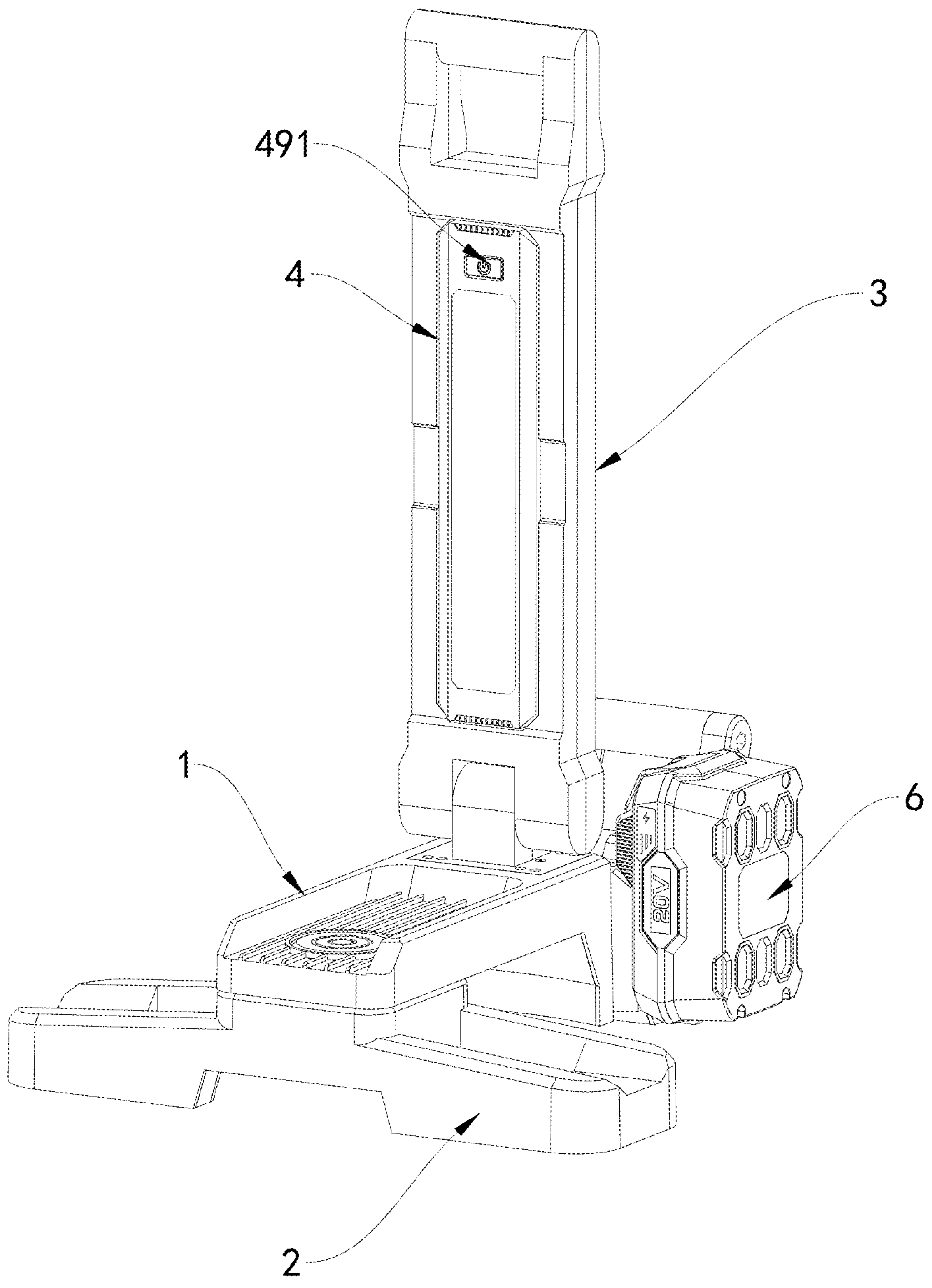
FIG. 15 is a schematic diagram of the structure of the invention with a single lamp holder connected to the main bracket body.
Figure 16:
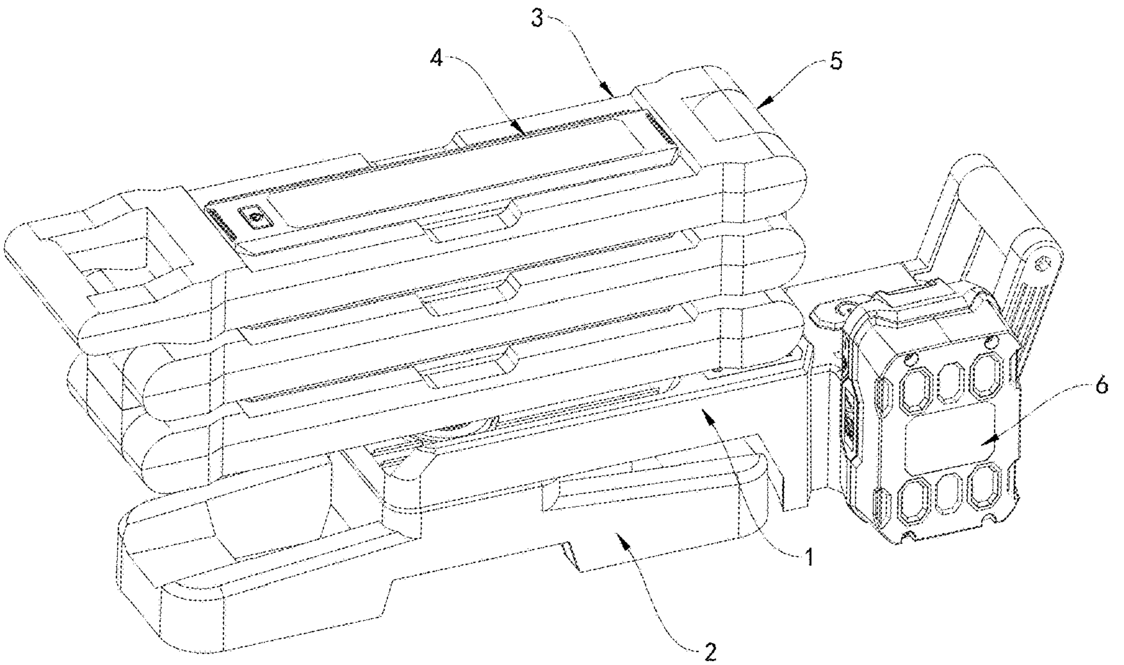
FIG. 16 is a schematic diagram of the structure of the invention with the supporting frame and the lamp holders folded and stored.
Figure 17:
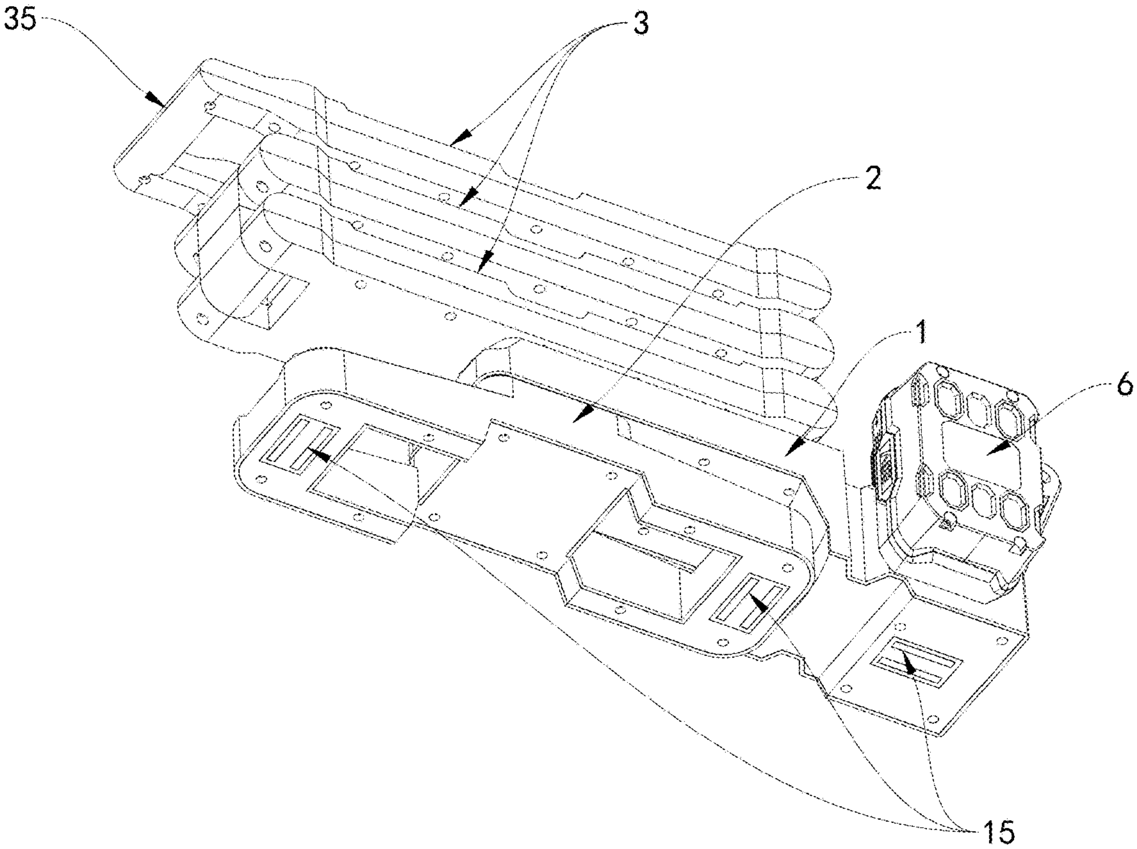
FIG. 17 is a schematic diagram of the structure of the invention with the supporting frame and the lamp holders folded and stored.

As shown in FIG. 2, in some embodiments, the bottom of the main bracket body 1 is provided with a storage slot 12, the supporting frame 2 is rotatably arranged at the bottom of the main bracket body 1 by a pivot shaft 13, and the top of the main bracket body 1 is further provided with a decorative sheet 14 to cover the pivot shaft 13; when the supporting frame 2 is in the supporting state, the supporting frame 2 and the main bracket body 1 form a triangular shape; a carrying handle 35 is arranged on one end of the lamp holder 3 which is farthest from the bracket body 1; when the supporting frame 2 is in the storage state, the supporting frame 2 and the main bracket body 1 form a straight line. In this embodiment, the number of lamp holders 3 is three. Referring to FIG. 1 and FIG. 14-FIG. 15, the number of lamp holders 3 is configured to be increased or decreased according to the user's needs; the lamp holder 3 with the carrying handle 35 is always positioned at the farthest point from the main bracket body 1, allowing the user to move the entire product by using the carrying handle 35.

Increasing the number of lamp holders 3 may cause the main bracket body 1 to become unstable and unable to properly support the lamp holders 3. In this case, simply rotating the supporting frame 2 to form a triangular configuration with the main bracket body 1 will enhance the stability of the main bracket body 1; the design of the storage slot 12 allows the supporting frame 2 to be rotated back into a straight configuration with the main bracket body 1 when not in use, reducing the occupied space and making it more convenient for transportation and storage.

As shown in FIG. 2-FIG. 13, in some embodiments, a bottom of one end of the main bracket body 1 and bottoms of both ends of the supporting frame 2 are embedded with bracket magnets 15, a top of one end of the main bracket body 1 is provided with a handle 16, the handle 16 is arranged at an inclined angle, one side of the main bracket body 1 is provided with a conductive socket 17, one side of the main battery pack 6 is provided with a conductive plug 61, the main battery pack 6 realizes electrical and mechanical connection by plugging the conductive plug 61 into the conductive socket 17.

The setup of the bracket magnets 15 allows the main bracket body 1 to not only be placed on a desktop for use, but also to be attached to metal objects using the bracket magnets 15; this makes the main bracket body 1 suitable for use not only on horizontal surfaces, but also on the sidewalls or inclined surfaces of metal objects, further expanding the product's application scenarios and making it more convenient to use. The setup of the handle 16 provides convenience for users to move the product. The setup of the main battery pack 6 enhances the battery life of the lamp 4, allowing the lamp 4 to be powered by the main battery pack 6 in the second working state; in the first working state, the lamp 4 is independently powered by the built-in auxiliary battery pack 47; when the main battery pack 6 runs out of power, it can be separated from the main bracket body 1 to charge the main battery pack 6.

Figure 9:
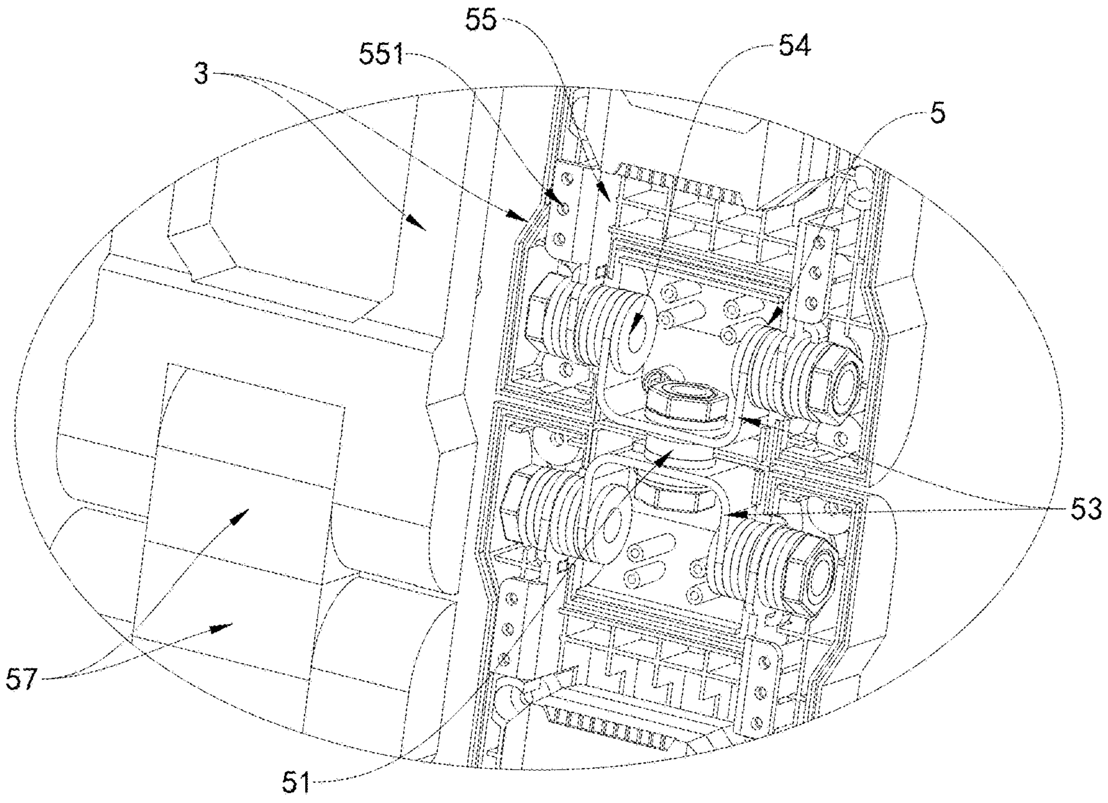
FIG. 9 is a schematic diagram of the structure of the hinge component of the invention.
Figure 10:
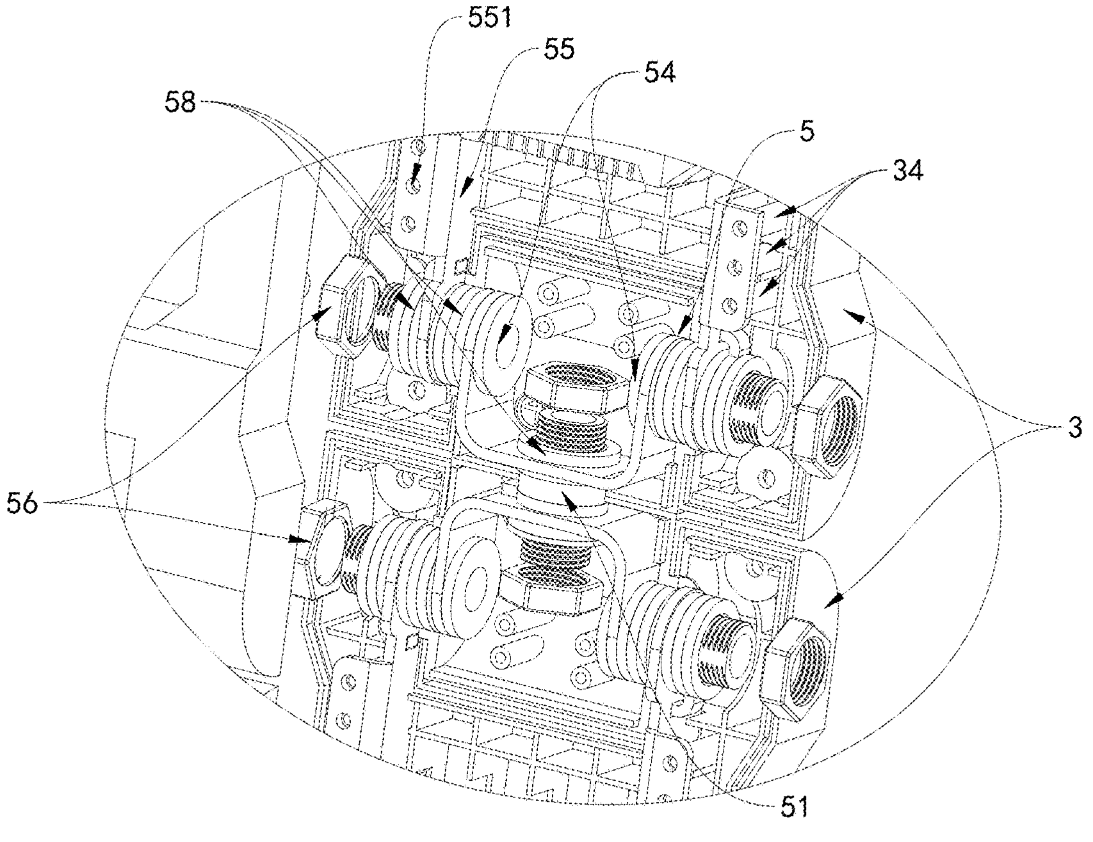
FIG. 10 is a schematic diagram of the structure of the double-headed screw of the invention.
Figure 11:
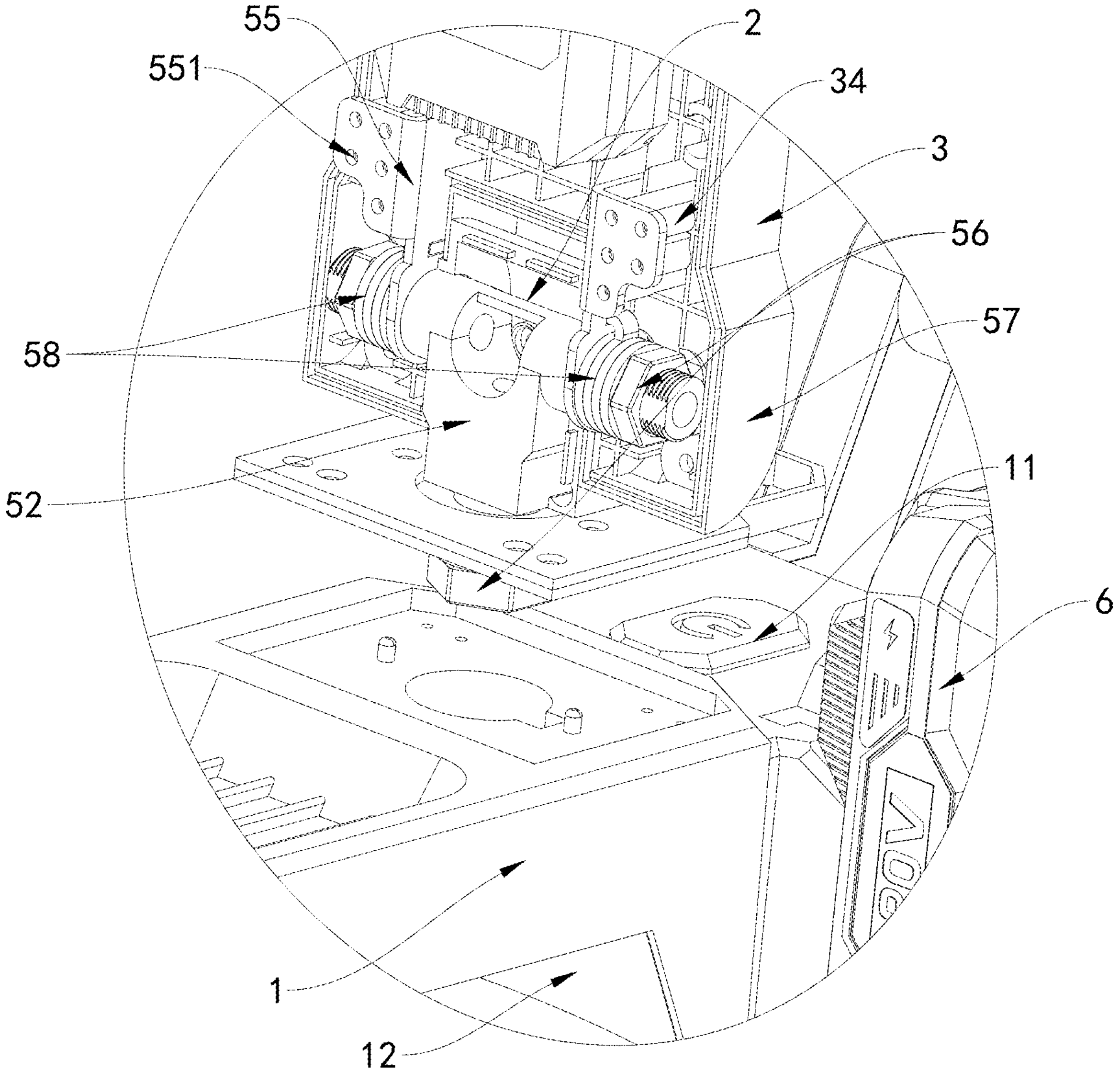
FIG. 11 is a schematic diagram of the structure of the triple-headed screw of the invention.

As shown in FIG. 9-FIG. 11, in some embodiments, the hinge component 5 comprises a double-headed screw 51, both ends of the double-headed screw 51 extending into interiors of two adjacent lamps 4, both ends of the double-headed screw 51 are rotatably provided with U-shaped components 53, two sides of the U-shaped components 53 are provided with single-headed screws 54, and one end of each single-headed screw 54 passes into the interior of the lamp holder 3 and is fitted with a fixing component 55 and a nut 56, one end of the fixing component 55 is provided with several limiting holes 551 that are engaged with the limit posts 34, both sides of the U-shaped component 53 are provided with decorative shells 57.

The U-shaped components 53 at both ends of the double-headed screw 51 can rotate relative to each other, allowing adjacent lamp holders 3 to adjust their angle by rotating 180 degrees around the double-headed screw 51 via the U-shaped components 53; alternatively, the angle can also be adjusted by rotating 180 degrees around the single-headed screw 54 using the fixing component 55, this design further increases the angle adjustment range of the lamp holder 3, allowing the three lamp holders 3 to direct their internal lamps 4 in different directions for illumination, meeting the user's needs. The decorative shells 57 are used to cover the U-shaped components 53, double-headed screw 51, single-headed screw 54, and triple-headed screw 52.

As shown in FIG. 9-FIG. 11, in some embodiments, the hinge component 5 further comprises a triple-headed screw 52, the triple-headed screw 52 is used to connect the main bracket body 1 and the lamp holder 3 adjacent to the main bracket body 1, two ends of the triple-headed screw 52 extend into the interior of the lamp holders 3 and are fitted with fixing components 55 and nuts 56, the other end extends into the interior of the main bracket body 1 and is fitted with a nut 56, several washers 58 are fitted on the triple-headed screw 52, double-headed screw 51, and single-headed screw 54.

The decorative shells 57 are also arranged on both sides of the triple-headed screw 52, the triple-headed screw 52 is used to connect the main bracket body 1 and the lamp holder 3, while the double-headed screw 51 is used to connect two lamp holders 3, the washers 58 add resistance to the rotation adjustment of the lamp holder 3, enabling automatic positioning after the angle adjustment of the lamp holder 3.

When in use, as shown in the figures, several lamp holders 3 can be folded via the hinge component 5, significantly reducing the size, making it easier for users to carry and transport. When needed, the lamp holders 3 can be unfolded by lifting and pulling them out one by one. In the second working state, the lamps 4 inside the lamp holders 3 can be synchronized on/off through the main control switch 11. Removing the lamps 4 from the lamp holders 3, in the first working state, each lamp 4 can be independently turned on/off via the lamp switch 491.

In summary, the rotatable supporting frame 2 enables triangular support or straight-line shaped storage, adapting to different usage scenarios. The lamps 4 are configured to be independently detached for handheld lighting or used with magnetic attachment or hanging. They can also be combined with the lamp holders 3 for centralized power supply and lighting control. The lamp holders 3 are connected using hinge components 5, supporting bidirectional angle rotation adjustment, allowing each lamp 4 to project light in different directions. The independent lamps 4 feature built-in heat dissipation middle shells 41, reducing the risk of high heat-related failures. The lamps 4 can be quickly attached or detached from the lamp holders 3 via magnetic attraction between the lamp magnets 48 and the iron sheets 33. The overall design balances portability, multi-scenario adaptability, and flexible lighting angle adjustment, meeting the needs for fixed desktop lighting, metal surface adsorption, and mobile lighting.

Finally, it should be noted that the above description is only preferred embodiments of the invention and is not intended to limit the invention. Although the invention has been described in detail with reference to the above embodiments, those skilled in the art can still modify the technical solutions described in the above embodiments or replace some of the technical features with equivalents. Any modification, equivalent replacement, improvement, etc. made within the spirit and principles of the invention shall be included in the scope of protection of the invention.

The invention claimed is:

1. A work lamp, comprising a main bracket body, a supporting frame, lamp holders and lamps;

the supporting frame is movably arranged at a bottom of the main bracket body, the supporting frame is configured to switch to a supporting state where it forms an angle with the main bracket body or a storage state where it fits parallel to the main bracket body;

several lamp holders are arranged at a top of the main bracket body, with adjacent lamp holders connected by hinge components to form a foldable structure that allows relative rotation and angle adjustment;

each lamp is detachably embedded in the lamp holder and has a first working state where it can be used independently after detaching from the lamp holder and a second working state where it is embedded in the lamp holder to adjust the angle synchronously.

2. The work lamp of claim 1, wherein one side of the main bracket body is detachably mounted with a main battery pack, an interior of each lamp holder is provided with a conductive terminal seat, an interior of the main bracket body is provided with a main control switch electrically connected to the main battery pack and the conductive terminal seats, the main control switch controls the on/off of all the embedded lamps synchronously when the lamps are in the second working state.

3. The work lamp of claim 1, wherein each lamp comprises a middle shell and a front shell and a rear shell fixed to both sides of the middle shell, the middle shell is made of aluminum material, one side of the middle shell is sequentially provided with a lamp board and a light bowl, and the other side is provided with a heat-insulating plate, one side of the heat-insulating plate is embedded with an auxiliary battery pack, and an interior of the front shell is provided with a lens corresponding to the light bowl.

4. The work lamp of claim 3, wherein both ends of the heat-insulating plate on one side are provided with lamp magnets, one end of each lamp magnet passes through to one side of the rear shell, one side of the middle shell is further provided with a control board located above the heat-insulating plate, one side of the control board integrates a lamp switch, and the other side integrates a power interface group and conductive terminals, one side of the rear shell is embedded with a charging plug corresponding to the power interface group, one end of the lamp switch passes through to one side of the front shell.

5. The work lamp of claim 3, wherein one side of the rear shell is provided with a groove, and a hook is rotatably arranged inside the groove.

6. The work lamp of claim 2, wherein when the lamp is in the second working state, the conductive terminal seat contacts the conductive terminals to form an electrical connection, an interior of the lamp holder is provided with a through hole and iron sheets located at a top and a bottom of the through hole; when the lamp is in the second working state, the iron sheets are positioned opposite to the lamp magnets and magnetically connected, both ends of the lamp holder are provided with several limit posts inside.

7. The work lamp of claim 1, wherein the bottom of the main bracket body is provided with a storage slot, the supporting frame is rotatably arranged at the bottom of the main bracket body by a pivot shaft, and the top of the main bracket body is further provided with a decorative sheet to cover the pivot shaft; when the supporting frame is in the supporting state, the supporting frame and the main bracket body form a triangular shape; when the supporting frame is in the storage state, the supporting frame and the main bracket body form a straight line.

8. The work lamp of claim 2, wherein a bottom of one end of the main bracket body and bottoms of both ends of the supporting frame are embedded with bracket magnets, a top of one end of the main bracket body is provided with a handle, the handle is arranged at an inclined angle, one side of the main bracket body is provided with a conductive socket, one side of the main battery pack is provided with a conductive plug, the main battery pack realizes electrical and mechanical connection by plugging the conductive plug into the conductive socket.

9. The work lamp of claim 1, wherein the hinge component comprises a double-headed screw, both ends of the double-headed screw extending into interiors of two adjacent lamps, both ends of the double-headed screw are rotatably provided with U-shaped components, two sides of the U-shaped components are provided with single-headed screws, and one end of each single-headed screw passes into the interior of the lamp holder and is fitted with a fixing component and a nut, one end of the fixing component is provided with several limiting holes that are engaged with the limit posts, both sides of the U-shaped component are provided with decorative shells.

10. The work lamp of claim 9, wherein the hinge component further comprises a triple-headed screw, the triple-headed screw is used to connect the main bracket body and the lamp holder adjacent to the main bracket body, two ends of the triple-headed screw extend into the interior of the lamp holders and are fitted with fixing components and nuts, the other end extends into the interior of the main bracket body and is fitted with a nut, several washers are fitted on the triple-headed screw, double-headed screw, and single-headed screw.

* * * * *